UNITED STATES PATENT OFFICE.

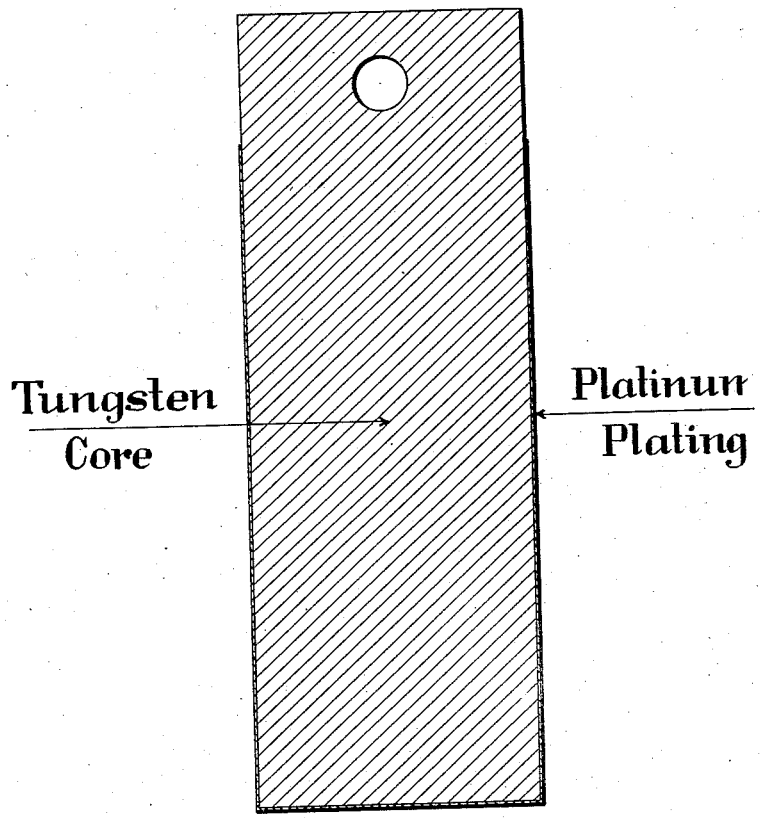

ROYALE H. STEVENS, OF SALT LAKE CITY, UTAH, ASSIGNOR TO UNITED STATES SMELTING, REFINING & MINING COMPANY, OF PORTLAND, MAINE, A CORPORATION OF MAINE.

ELECTRODE.

1,077,894.      Specification of Letters Patent.      Patented Nov. 4, 1913.

Application filed September 29, 1911. Serial No. 652,020.

*To all whom it may concern:*

Be it known that I, ROYALE H. STEVENS, a citizen of the United States, residing at Salt Lake City, in the county of Salt Lake and State of Utah, have invented certain new and useful Improvements in Electrodes, of which the following is a specification.

My invention relates to electrodes used in electric lighting, electro-plating, electro-metallurgy and in the construction of electric batteries and cells.

In the use of electricity for producing light, and in storing electricity in batteries and cells; for electro-plating and in extracting the metallic values from ores and compounds, known as electro-metallurgy; the deterioration of the electrodes,—anodes and cathodes—has been a serious difficulty.

My purpose is to provide an efficient electrode for use in all those classes of solutions and fused compounds in which, by means of a direct electric current, metals are deposited on or at the cathode, and such gases as oxygen, chlorin, bromin, iodin, fluorin, cyanogen and their compounds are liberated at the anode.

A further object is to provide an electrode for use in arc smelting and resistance smelting.

A still further object is to improve and enlarge the use of tungsten as electrodes in the several uses that such metal may be adapted to, in the general character outlined above and as may be developed when used as hereinafter described, and I herewith present a method for constructing a simple and efficient electrode for use in sulfuric acid and sulfate solutions which will withstand the disintegrating and dissolving effect of the liberated oxygen produced by the action of a direct electric current passing through the solution.

These objects I attain by the manipulation and use of the following constituent elements and as adapted and used to produce the desired results, it being understood that slight variations may be resorted to within the scope of the claim, without departing from the spirit of my invention.

In the drawing, the present invention is illustrated as embodied in a platinum-plated tungsten electrode for use in an electrolytic bath. The platinum plating covers the portion of the electrode which is to be immersed in the electrolyte. While for the sake of illustration, the platinum plating is shown as having an appreciable thickness, it is to be understood that in the actual electrode, the plating is a very thin electro-plating.

In carrying out my invention and putting the same into practice the metallic tungsten is formed into the shape desired for the electrode. It is then to be plated with metallic platinum, which I preferably accomplish by placing the thus formed electrode in a solution of platinum chlorid holding an excess of sodium phosphate made slightly acid with phosphoric acid, and in a position where said electrode will become the cathode. I then pass a current of electricity of from one and two tenths to two volts for about two hours, this will plate the said electrode with metallic platinum. The said electrode is then detached and washed in pure water and dried. The said tungsten electrode will act as a cathode before it is plated with the platinum, but when used as an anode in a sulfuric solution it will not conduct electricity. There are some solutions in which the unplated tungsten will act as an anode, but the anode will deteriorate and I use the platinum film or plating as a protection therefor. But when plated with the platinum the tungsten becomes as good a conductor as the solid platinum, and by reason of the cheapness, is much to be preferred as it possesses all the qualities for conducting electricity that is possessed by the platinum. As it takes a higher temperature to fuse or melt tungsten than it does platinum, there are many uses that a platinum plated tungsten electrode may be used for, and where such an electrode would be more desired, such as in electric furnaces for smelting or refining ores and metals. As will be readily observed the use of platinum plated tungsten electrodes will be far superior to carbon electrodes as they do not oxidize so readily.

Having thus described my invention I desire to secure by Letters Patent and claim:—

A platinum-plated tungsten electrode.

In testimony whereof I have affixed my signature in presence of two witnesses.

ROYALE H. STEVENS.

Witnesses:
  BEN L. CORUM,
  SAM RANEY.